United States Patent
Montijo

(10) Patent No.: US 6,760,998 B1
(45) Date of Patent: Jul. 13, 2004

(54) CHRISTMAS TREE SELF-WATERING APPARATUS

(76) Inventor: David Lee Montijo, 1513 Drexler Dr., Davis, CA (US) 95616

( * ) Notice: Subject to any disclaimer, the term of this patent is extended or adjusted under 35 U.S.C. 154(b) by 0 days.

(21) Appl. No.: 10/326,537

(22) Filed: Dec. 23, 2002

(51) Int. Cl.⁷ .................................................. A01G 7/06
(52) U.S. Cl. ......................................... 47/40.5; 47/57.5
(58) Field of Search ................................ 47/40.5, 57.5

(56) References Cited

U.S. PATENT DOCUMENTS

| | | | | |
|---|---|---|---|---|
| 2,938,304 A | * | 5/1960 | Thomas ...................... | 47/57.5 |
| 3,992,813 A | * | 11/1976 | Freshel ....................... | 47/57.5 |
| 4,031,833 A | * | 6/1977 | Ibanez ......................... | 111/7.1 |
| 4,896,454 A | * | 1/1990 | Cronenwett et al. ......... | 47/57.5 |
| 5,477,638 A | * | 12/1995 | Corradi et al. ............... | 47/57.5 |
| 6,073,390 A | * | 6/2000 | Baudier ...................... | 47/40.5 |
| 6,167,651 B1 | * | 1/2001 | Luddy ........................ | 47/40.5 |

* cited by examiner

*Primary Examiner*—Peter M. Poon
*Assistant Examiner*—Jeffrey L. Gellner
(74) *Attorney, Agent, or Firm*—Mark C. Jacobs

(57) ABSTRACT

A self-contained cut Christmas tree, or water flow deprived other tree, watering apparatus having a water storage portion and a tree surround portion fluidly connected. The tree surround houses a plurality of water injectors, which are screwed into the tree trunk once the tree surround is fixed in a tree encircling position. Water flows from the storage portion, which is disposed at a higher elevation to the tree surround disposed at a lower elevation through the injectors directly into the interior of the tree.

11 Claims, 4 Drawing Sheets

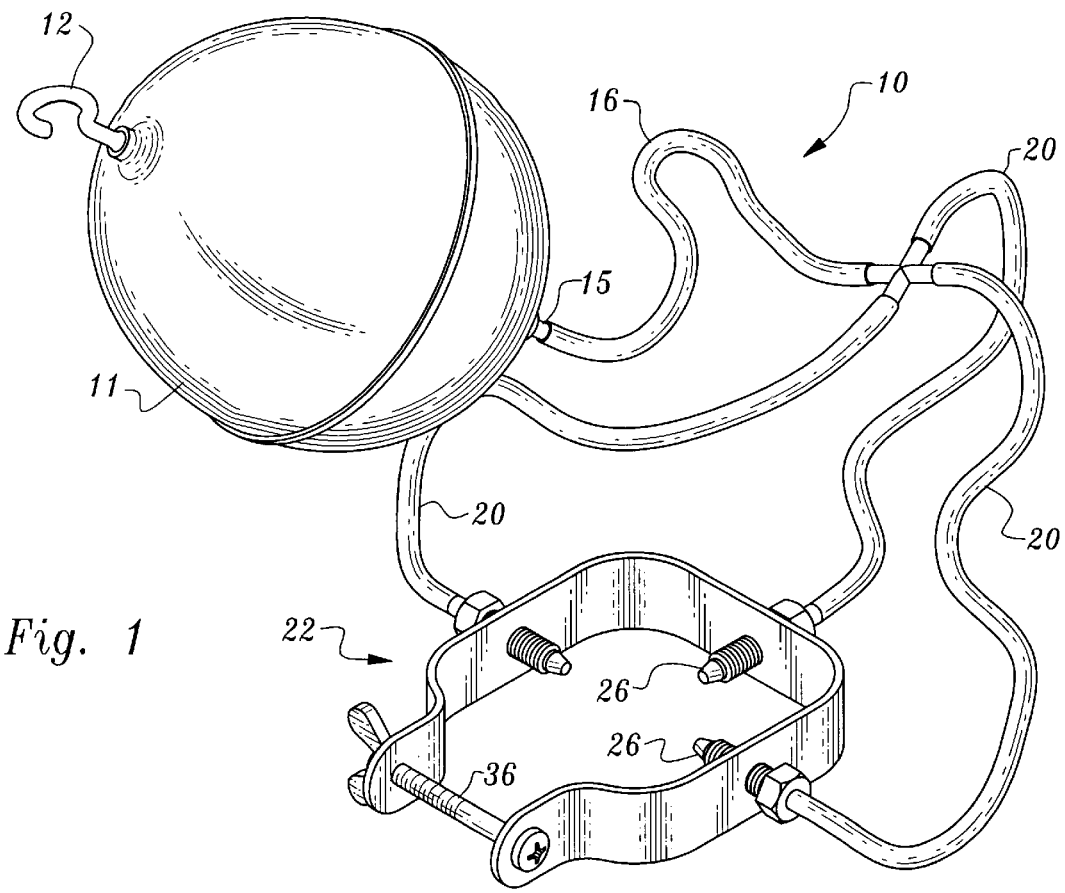
Fig. 1
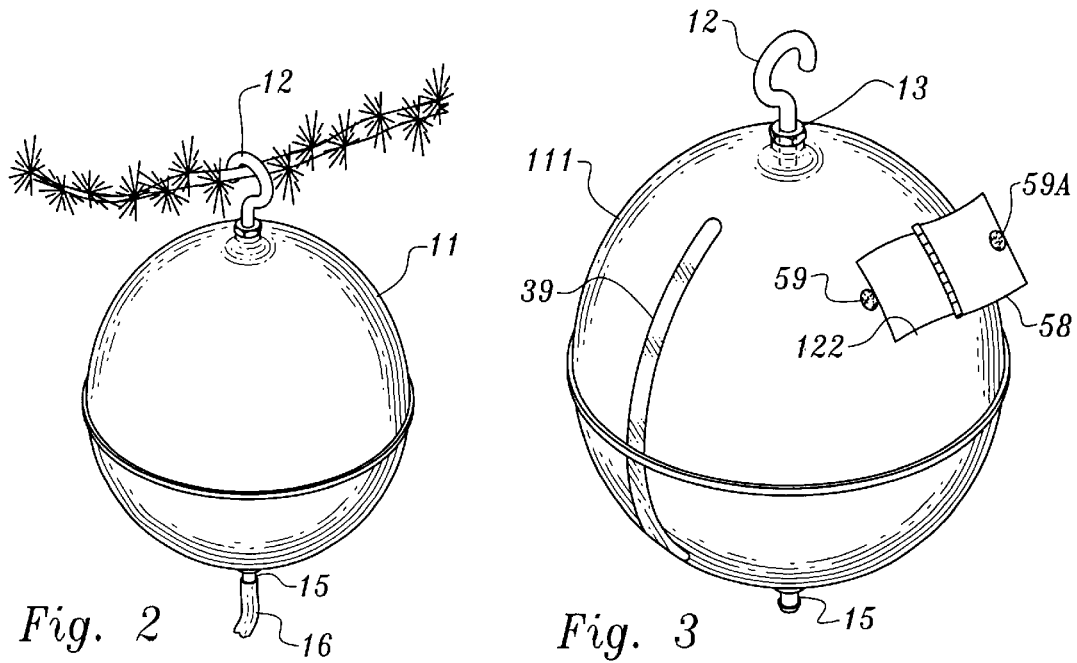
Fig. 2
Fig. 3

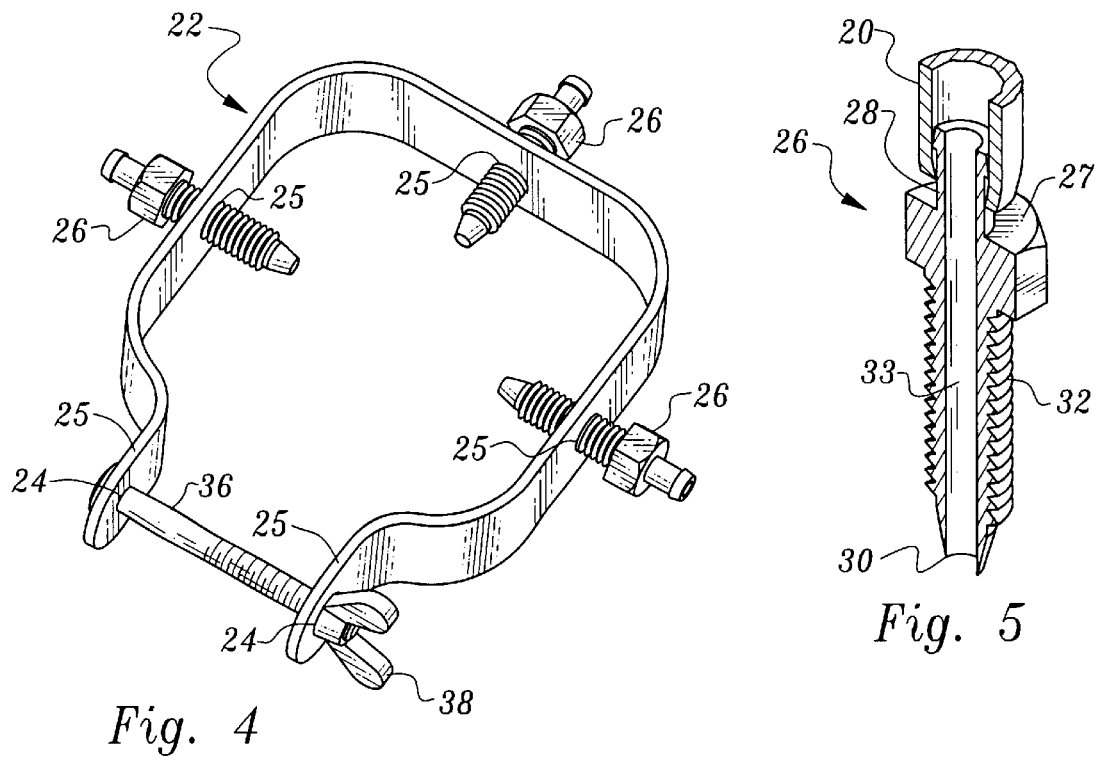
Fig. 4
Fig. 5
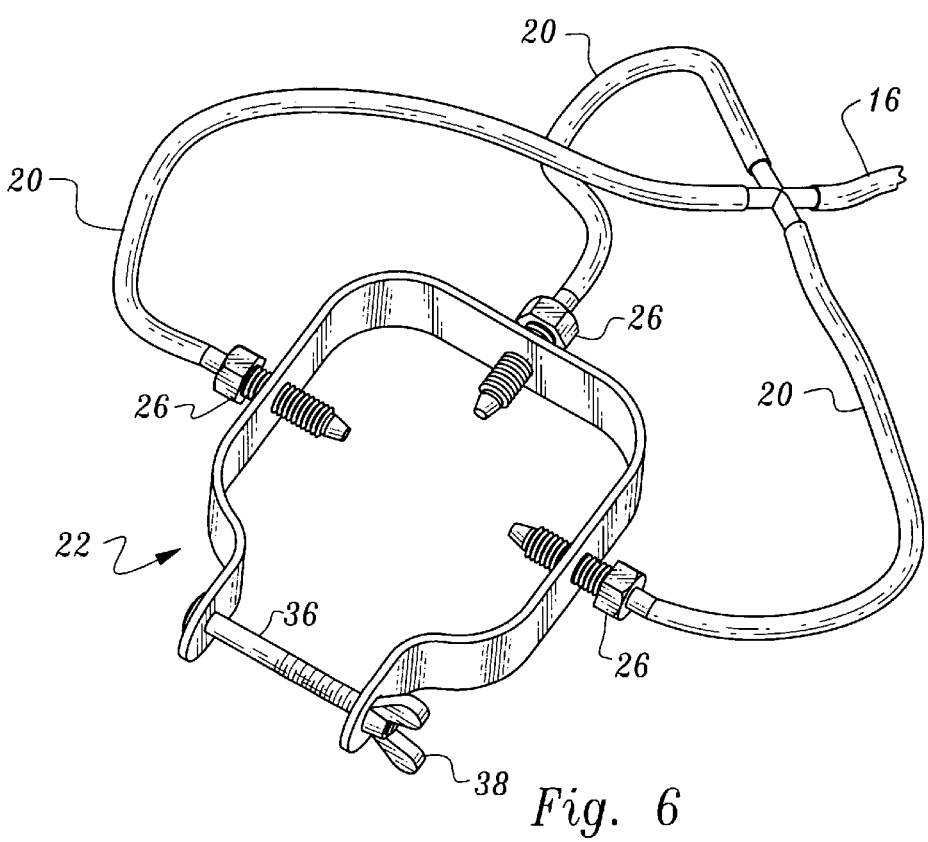
Fig. 6

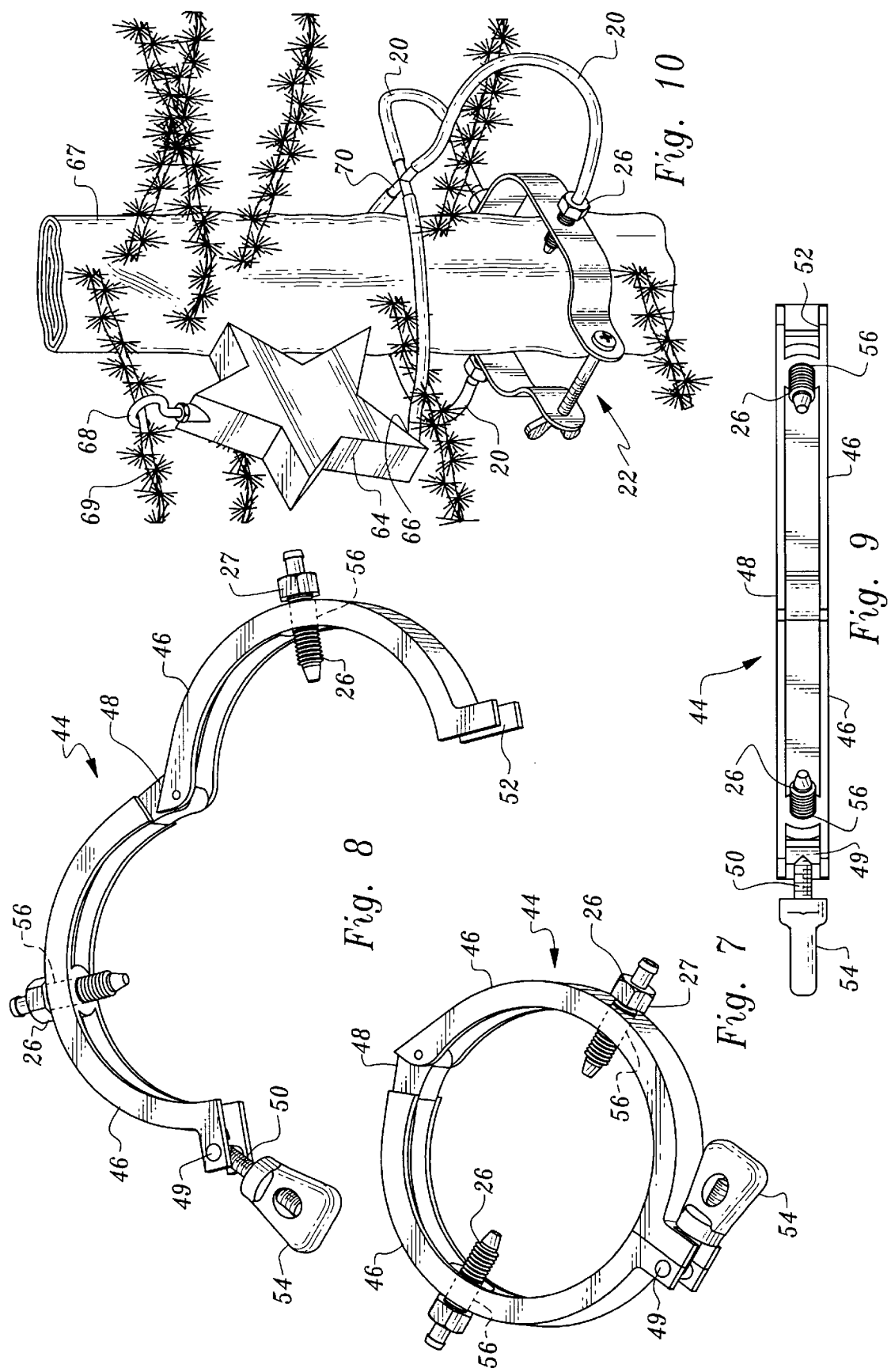

US 6,760,998 B1

CHRISTMAS TREE SELF-WATERING APPARATUS

FIELD OF THE INVENTION

This application pertains to a device which has a finite source of water that will deliver water to a cut tree's trunk by gravity from the source.

BACKGROUND OF THE INVENTION

Many prior art Christmas tree watering devices have been invented and patented over the years, but some of these include a source of a finite amount of water. Others need to be connected to a water source most of the devices are devised to deliver the water to a pan or trough for absorption through the bottom of the cut trunk and through that portion of the ball standing in the pan or trough of water.

Applicant was of the belief that if the water could be delivered to the interior of the tree that less water would be needed to keep the tree alive. He was also of the belief that a finite amount of water in a vessel could be used to provide a self-contained watering system for a cut tree. Optionally, by closing off the source container less water would be lost to evaporation and/or spilled on rugs or floors, it was further envisioned to put in a sight tube to give the user information as to when to refill the vessel with additional water. All of these features have been incorporated into the self-contained Christmas tree watering device of this invention.

It is an object, therefore, to provide a self-contained tree watering device that stores a finite amount of water and delivery of that water to the interior of the trunk through the bark.

It is a second object to provide the vessel of the waterer of this invention with the ability to appear as an ornament and to be capable of being hung on the tree.

It is a third object to provide a waterer that has a closable opening finite source vessel, and further provide a delivery tube on the storage vessel.

It is fourth object to provide a multi input collar that is adjustable in size such as to fit various tree trunk girths for the delivery of water.

It is a fifth object to provide the multi input collar with the ability to pierce the tree bark to thereby deliver water to the interior of the tree trunk.

These and other objects of the invention will in part be obvious and will in part appear hereinafter.

The invention accordingly comprises the apparatus possessing the features, properties, the selection of components which are amplified in the following detailed disclosure, and the scope of the application of which will be indicated in the appended claims.

For a fuller understanding of the nature and objects of the invention, reference should be made to the following detailed description, taken in conjunction with the accompanying drawings.

SUMMARY OF THE INVENTION

A self-contained Christmas tree watering device that appears to be a tree ornament and hangs from the tree as if it were one. The invention includes an adjustable multi input collar that encircles the tree trunk and punctures the bark of the tree. Fluid is delivered through tubing from the storage vessel portion of the device to the multi input delivery portion for withdrawal by the tree according to the trees needs.

The storage portion may include a cover at the input to prevent spillage and a sight tube to indicate current water level may also be included.

BRIEF DESCRIPTION OF FIGURES

FIG. 1 is a perspective view of the first embodiment of this invention.

FIG. 2 is a closeup perspective view of the storage portion hanging in a tree.

FIG. 3 is a view similar to FIG. 2 but also depicting the optional features of a closure for the watering opening and a sight tube.

FIG. 4 is a top perspective view of the adjustable multi input portion of the invention.

FIG. 5 is a closeup view of one injector of the delivery portion of the invention.

FIG. 6 is a perspective view of the first embodiment but without the water storage portion.

FIG. 7 is a top plan view of the second embodiment of the tree surround portion of the invention in closed position.

FIG. 8 is a similar view but of the second tree surround in open position.

FIG. 9 is an inside end view of the second tree surround of this invention.

FIG. 10 is a perspective view showing an alternatively configured storage portion of the apparatus hung on a tree branch.

DESCRIPTION OF THE PREFERRED EMBODIMENT

Figure 11:
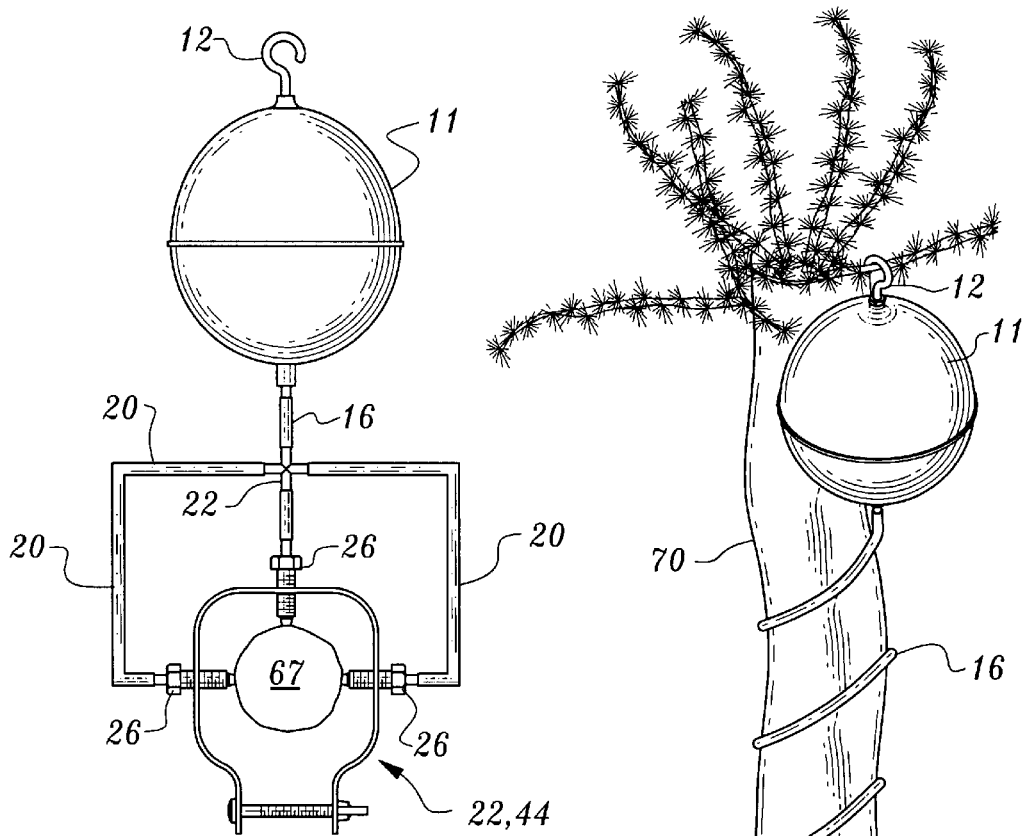
FIG. 11 is a diagrammatic view showing the delivery of water to the cut tree.

Turning to FIG. 1, one sees the apparatus of this invention 10 in perspective. The apparatus 10 of this invention comprises two main components, the water storage vessel 11, and a tree surround of which there are two embodiments designated 22 and 44 respectively. Each shall be described separately.

Vessel 11, shown in FIG. 1, is a closed watertight container of a content in the range of about eight ounces to thirty-two ounces (one fluid quart). Vessel 11 can be hung from a branch of the tree by the hook 12, disposed at the top thereof. This hook 12 can be welded, soldered, glued, or bolted onto the vessel using conventional techniques. Hook 12 could also be in the form of an arm or other hanger if desired.

In FIG. 3 the hook is attached to the vessel through a threaded opening 14 in the vessel through which the hook bolt is threadedly engaged. A nut 13 secures the threaded bolt aspect of the hook into tight engagement.

A nipple 15 is disposed in fluid communication with vessel 11 at the bottom thereof. It is to be understood that the nipple can be integrally formed with the vessel or attached thereto as by gluing, soldering, or welding it in position in alignment with an opening in the vessel. Thus, water in the vessel can flow down and out through nipple 15.

A length of rubber or plastic tubing 16 having an interior diameter slightly greater than the exterior diameter of the nipple 15 is disposed up onto the nipple an adequate distance such that leakage is avoided. Silicone glue can be used to seal the circular opening to prevent water droplets from leaking out the top of the tubing subsequent to engagement with the nipple. The tubing length 16 can vary from a foot to several feet dependent upon the size of the tree and the location on the tree where the vessel is to be hung. The actual length of tubing 16 is noncritical.

While one end of tubing length 16 is disposed on the nipple, the other end is attached to a splitter 18 which divides the water flow. Such a splitter has one end connected to the tubing and a plurality of output ends, here three outputs. Splitters are easily available and are well known in the art of water drip systems.

Each output of the splitter 16 is itself fluidly connected to one end of a short length of tubing, called a short tubing 20. The length of the short tubing 20 is noncritical as well and depends on the relative size of the tree. Each of the short tubing lengths 20 is connected on its opposite end to a water delivery injector 26 one of which is disposed within one of the two embodiments of the tree surround, be it 22 or 44.

The reader's attention is now diverted to FIG. 4 where the first embodiment 22 of the tree surround designated 22 is seen. This unit 22 has a generally U-shaped body which is slightly flexible and with optionally inwardly extending arms 25. A pair of aligned bores 24, one per arm are disposed near the terminus of each arm. A threaded bolt 36 passes through the two aligned bores 24 and is retained in position by a wing nut 38 or other similar nut. As the nut is tightened, the U-shaped body is pulled into close proximity with the tree trunk.

At these spaced locations, as shown, there are water delivering injectors 26 disposed through bores 25 in the tree surround 22. While three such water delivering injectors 26 are shown, more or less than three injectors can be utilized.

Figure 13:
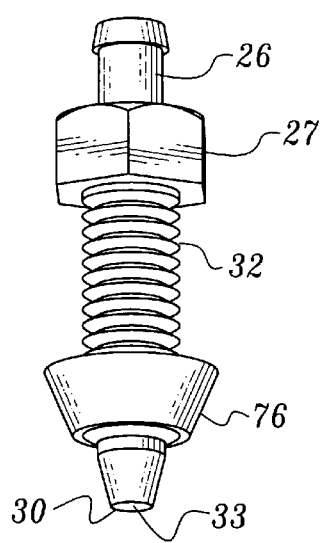
FIG. 13 is a closeup plan view of an injector having a sealer bushing thereon.

The reader is now directed to FIG. 5 in conjunction with FIG. 1. Here a closeup view of one injector (FIGS. 5 and 13) 26 is seen. Each injector employed herein in both embodiments of the tree is the same and so this discussion is pertinent to both embodiments of the tree surround.

Each injector 26 has an upstanding cylindrical section for engagement with the short tubing 20, aforementioned, for fluid to enter the injector 26. A head or nut section 27 which is used to tighten the injector into position is interposed between the upstanding section a threaded tapped shaft 32, which shaft has an internal throughbore 33. This throughbore 33 is in fluid communication with the upstanding cylindrical section 28. The threaded bored shaft 32 tapers to an open end point 30 for ease of insertion into a tree trunk 67 not seen in this figure. In FIG. 11, one such tree surround is shown disposed on a tree. Water can flow from the short tube through the water injector out through its tapered point in the tree interior, when the injector is screwed into the tree trunk 67.

The discussion now returns to FIG. 3. Here a modified version of vessel 11 is seen and is designated 111. All aspects of the basic vessel 11 are present in vessel 111, and will not be set forth again. However, the modified vessel also includes a clear sight tube running substantially elevational of the vessel. This clear plastic or glass member allows the viewer to determine the liquid level in the vessel 111 by a mere glance. Sight tubes such as 39 are well known in the art of storage vessels and containers.

A door 58 is hingedly connected adjacent opening 122 to help prevent both evaporation of the contents of the vessel and accidental spillage. A two-part closure 59, 59A such as two Velcro® or equal closure tabs or a two-part snap or other conventional closure can be used to retain the door 58 in a closed position.

The discussion now moves to FIGS. 7, 8, and 9. These are a top plan view of the second embodiment of the tree surround 44 in a closed position, a similar view thereof in an open position, and an inside end view open position thereof respectively.

This second tree surround 44 has two semicircular arms 46 connected at one end of each arm 46 by a pivot pin slide connector that permits the two respective jaws 48 to separate a slight distance laterally for enhanced rotational movement. Such pivot pin connectors are known in the art.

At the opposite ends of each of the two semicircular arms 46 is another connection. One end of one arm, either arm, has a pivoting threaded shaft 50 seen best in FIG. 8 and 9. The pivot pin 49, which is disposed through the shaft, is located at the end of an armlet 52 designated in FIG. 8. The pivot pin passes normally thought the shaft 50, again better seen in FIG. 8. Disposed at the end of the shaft 50 is a rotating head 54 for tightening on the shaft. Note the relative placement of the rotating head 54 in FIG. 7 wherein shaft is visible in the opening in the head, and the loose position of the head with no shaft showing as the head has been rotated counter clockwise, in FIG. 8.

Designator 56 refers to the dashed lines as the location of the throughbores here two—not visible, one per semicircular arm 46 in the side edge of the tree surround 44, for the future insertion of a water injector 26.

Note specifically FIG. 9 wherein the rotating head 54 sits at the end of the threaded shaft 50. The disposition of shaft 50 for positioning within the two parts of armlet 52 is also seen. Devices of this nature are known to the scientific community but not with the pair of openings 56 therein for the threaded or friction fit engagement of water injectors therein.

Once threaded or otherwise fit into the openings 53 the pivot lock pin shaft 50 is put into the armlets 42 and tightened around the tree trunk. Then the injector may be screwed into the tree trunk. The insertion of the injector into the tree requires a simple hand turning of the nut heads 27 though a Crescent® or other wrench may make the going easier.

In FIG. 10, an alternate shaped vessel 64 is seen. This is in the shape of a star. It has a hook 68 for mounting on a branch 69 of tree 67. The vessel opening to receive water is designated 65. An optional door with closure, both not seen may be employed. The nipple 66 extends from the bottom of one point of the star-shaped vessel for delivery of water to tubing—not seen, connected to the nipple 66.

As can also be seen a length of tubing is directly connected to nipple 66. A four-part splitter 70 is then connected to the opposite end of the length of tubing and from the splitter a connection is made to each of the injectors disposed within the tree surround. Note tree trunk 67 safely within the confines of the tree surround 22.

In FIG. 11 a diagram to illustrate water flow is set forth. Thus, vessel 11 is seen to be connected by tubing length 16 to a splitter 22. Splitter 44 could be positioned as a replacement.

Short length of tubing 20 runs to each of the three water injectors 26 which when properly tightened penetrate the tree bark into the inner core of the tree for direct delivery of water to where it is actually used, as opposed to prior art devices which bring water to a cut base of the tree.

The vessel used herein may be of plastic or any non-rusting metal, such as stainless steel or copper. Common ¼ inch tubing, as found in aquarium stores, may be used for the flow injector, both for the tubing length and the short lengths of tubing.

As to the injectors, material such as poly carbonate or stainless steel or other plastic that can be machined such as Delrin® may be employed.

By tightening the screw tightly the tree surround 44 will stay in place around the tree. Thus, surrounds should be able to encircle a three to an eight-inch tree trunk on average.

It is seen that I have created an apparatus whose vessel can be hung onto a tree branch, per the figures from which water can descend by gravity to a plurality of injectors. Thus, the water will go directly into the perineum of the tree without damaging the tree.

Figure 12:
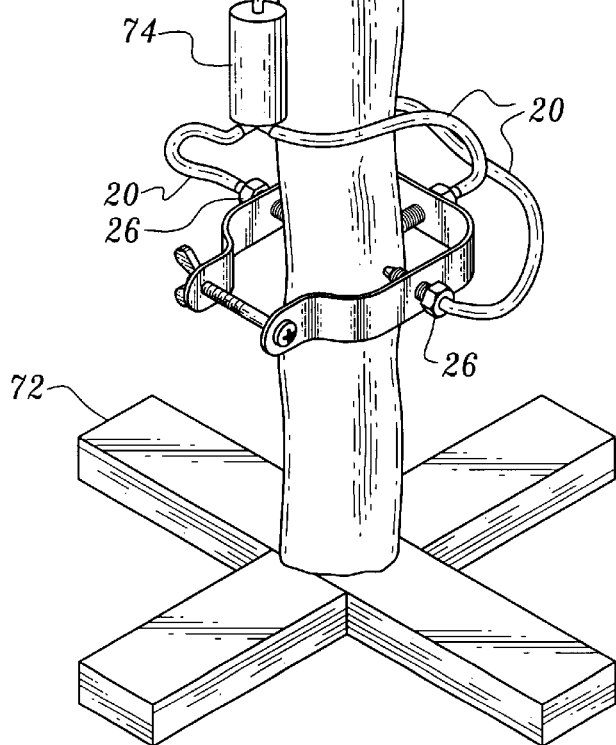
FIG. 12 is a view of the "tree" created to test the operability of this invention.

In FIG. 12, a Christmas tree was simulated by cutting a large branch 70, from a living arbor vitae, and placing it on the stake portion (unseen) of a base 72, much like what a person would do with a fresh cut Christmas tree. A storage portion 11 having a hook 12 thereon was placed thereon and a tree surround such as 22 or 44 was attached as previously described to branch 70. An optional particulate filter 74 was placed in line in fluid communication with tubing 16. The purpose of the filter is to trap small particles and to therefore prevent clogging of the water injectors. Such filters are found in the drip line irrigation art, and are placed in line in fluid communication with the water storage portion. The injectors were inserted into this simulated tree "trunk" and the intake of water was measured for this live branch.

| Day | Water Intake (oz per day) |
| --- | --- |
| 1–2 | 10–20 |
| 3–7 | >12 |
| 8–14 | 5–7 |
| 15–21 | <6 |

The intake is seen to decrease as the cut "tree" ages and eventually dies. The experiment was discontinued after 30 days while the branch was still taking up water and the needles thereon were still flexible and alive.

It is to be noted that an optional filter may be employed to prevent any small dirt particles or insects from clogging the water lines to the respective injector.

While the apparatus of this invention is meant primarily for the use of watering cut down Christmas trees, other uses of the apparatus are also seen.

For example, people who reside in apartments may have a patio but no hose line on the patio. Small living trees that can be kept in pots of up to 50 gallon size, more or less, can now be kept growing in a pot with the apparatus of this invention serving as the means for watering such a full live tree e.g., Ficus. Whereas heretofore, such person would need to bring a periodic pitcher of water from the kitchen or bath to water such a patio tree.

A related use would be for homeowners who reside in desert or rocky areas where irrigation pipes are not present. The use of the apparatus of this invention permits people to grow trees in areas where due to soil or climate conditions, trees normally do not thrive.

Since certain changes maybe made in the described apparatus without departing from the scope of the invention herein involved, it is intended that all matter contained in the above description and shown in the accompanying drawings shall be interpreted as illustrative and not in a limiting sense.

I claim:

1. A Christmas tree watering apparatus which comprises:
    (a) a vessel for the storage of water, which vessel includes a hook at the top thereof for disposition upon a relatively high limb of a Christmas tree, and a nipple at the bottom thereof in fluid communication with the vessel,
    (b) a length of tubing fluidly connected at one of its ends to said nipple, and fluidly connected at the other of its ends to,
    (c) a splitter having one input and a plurality of fluid outputs, capable of splitting a water stream into a plurality of water streams,
    (d) a plurality of lengths of tubing equal to the number of outputs from the splitter, each of which lengths of tubing is connected at one end to the splitter and at their respective other end, to the input end of one of
    (e) a plurality of water injectors, the plurality number of injectors being equal to the number of outputs from the splitter, each of which injectors is disposed in a tree surround;
    each of said water injectors being adapted to threadedly engage the interior of a tree trunk when said tree trunk has a tree surround disposed on and around said tree trunk, whereby when said tree surround is at an elevation lower than said vessel and said injector(s) are engaged to said tree, water can flow by gravity directly into said tree trunk wherein, the tree surround has a generally U-shaped body configuration, wherein the two arms of the body each have an aligned aperture near the terminus thereof wherein a threaded pin is disposed through the aligned apertures, said pin having a tightener thereon, and said body having a plurality of apertures spaced along the body, each of which has a water injector disposed therein.

2. The apparatus of claim 1, wherein each water injector has an upstanding open end cylindrical section, fluidly connected through a head section to a tapped threaded shaft;
    wherein the head section and the shaft are in fluid communication, and
    which shaft at the end distant from the head section, terminates in an open tapered point through which fluid can pass.

3. The apparatus of claim 1, wherein the tree surround has a generally circular body configuration which body comprises a pair of semicircular arms pivotally connected to each other;
    each arm having an armlet, which armlets extend outwardly from the terminus of one arm, on one of which armlets is disposed a pivotable threaded shaft, which carries a rotatable tightener, the other of which armlets is a clevis within which the shaft is disposed for tightening.

4. The apparatus of claim 1, wherein the number of injectors disposed in the tree surround is within the range of two to three.

5. The apparatus of claim 1, wherein the vessel is star-shaped.

6. The apparatus of claim 1, wherein the vessel includes a door and a closure for the door to retain water put therein from spilling.

7. The apparatus of claim 1, further including a sight tube to determine the water level of the vessel.

8. The apparatus of claim 1, wherein there are three injectors disposed within the body of the tree surround.

9. The apparatus of claim 3, wherein there are two injectors disposed, one per semicircular arm.

10. The apparatus of claim 3 further including an in-line particulate filter connected in fluid communication with the water storage portion.

11. The apparatus of claim 1 further including an in-line particulate filter connected in fluid communication with the water storage portion.

* * * * *